April 29, 1952     J. E. SEES     2,595,205
DEVICE FOR AUTOMATICALLY TRACKING HEAVENLY BODIES
Filed May 26, 1950     3 Sheets-Sheet 1
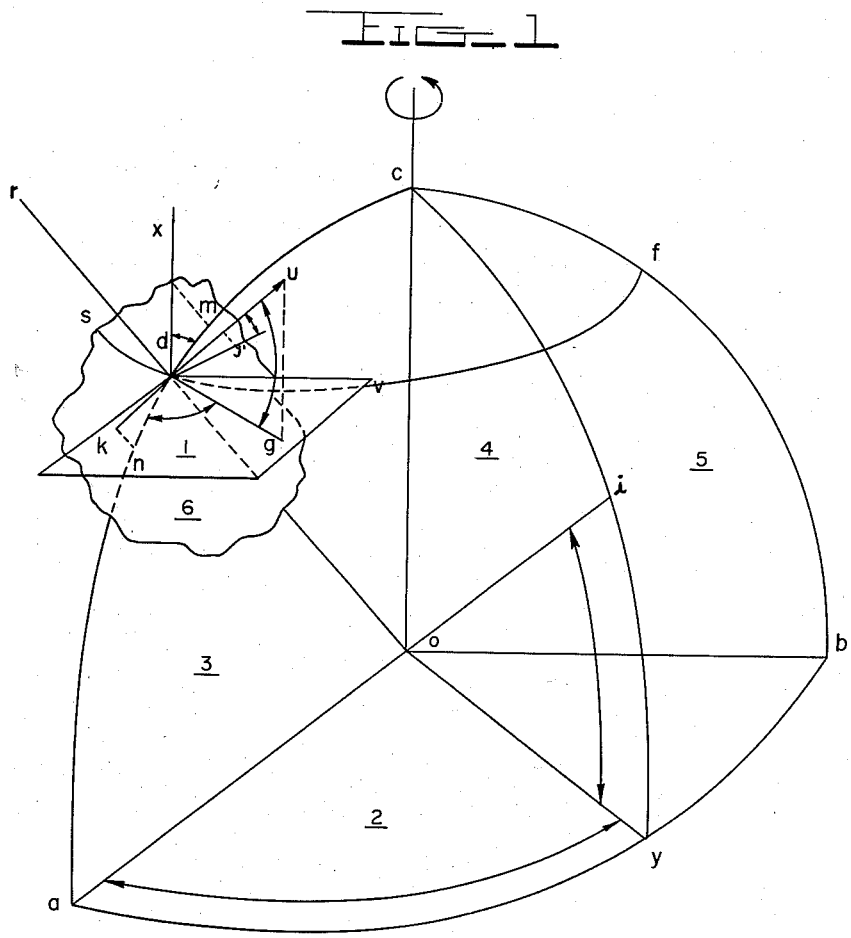
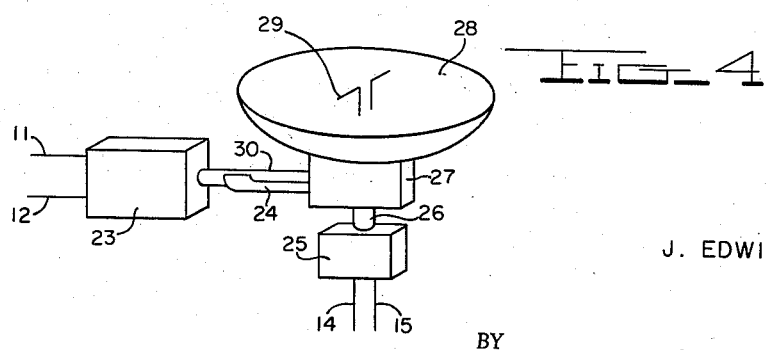
INVENTOR
J. EDWIN SEES
BY
ATTORNEYS

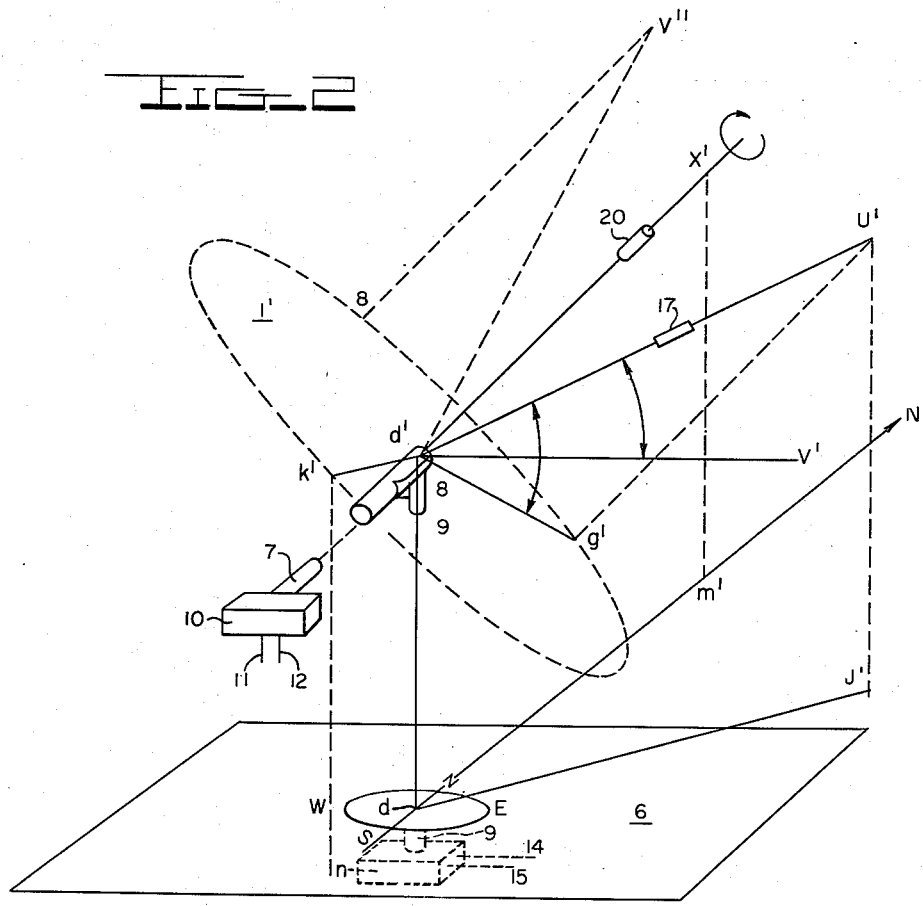

April 29, 1952  J. E. SEES  2,595,205
DEVICE FOR AUTOMATICALLY TRACKING HEAVENLY BODIES
Filed May 26, 1950  3 Sheets-Sheet 3
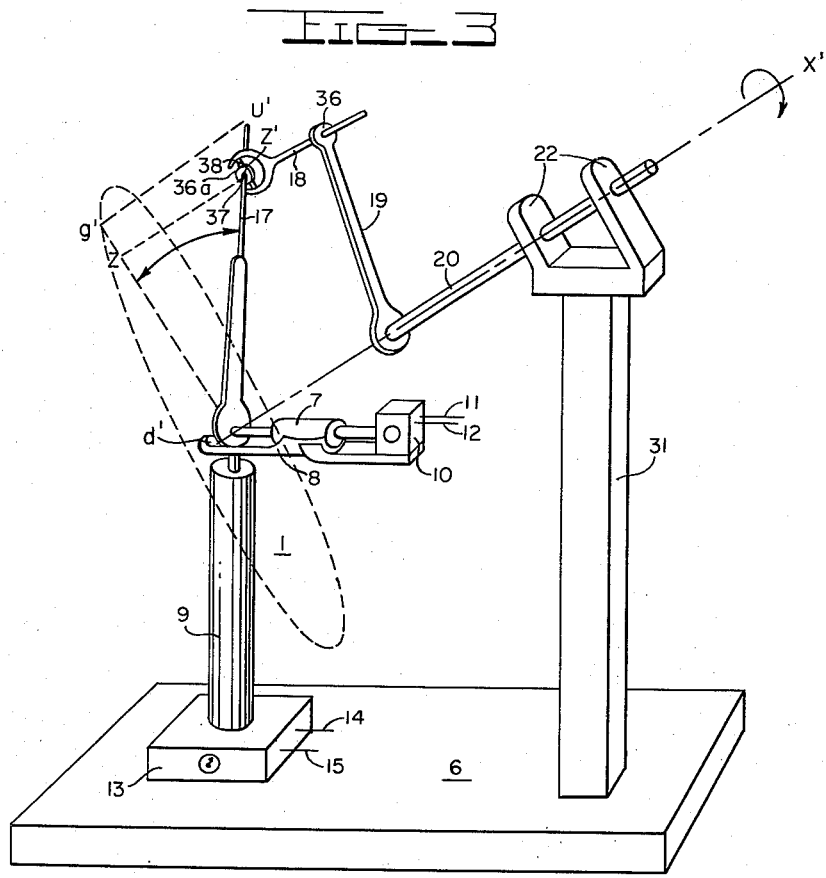
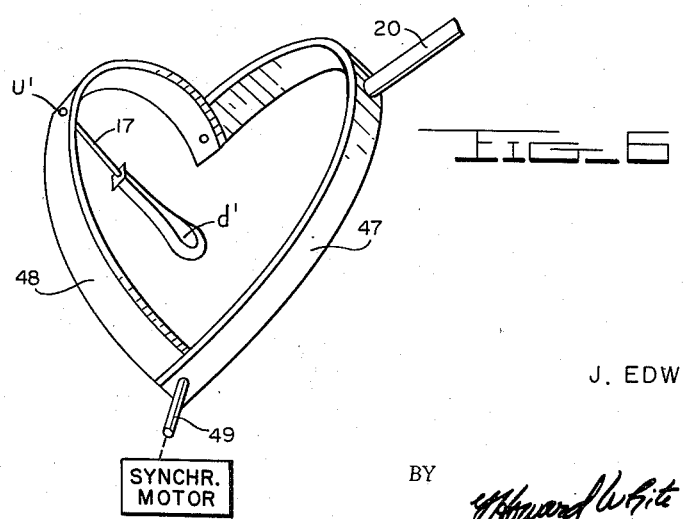
INVENTOR
J. EDWIN SEES
BY
ATTORNEYS Patented Apr. 29, 1952

2,595,205

UNITED STATES PATENT OFFICE 2,595,205

DEVICE FOR AUTOMATICALLY TRACKING HEAVENLY BODIES

James Edwin Sees, Washington, D. C.

Application May 26, 1950, Serial No. 164,581

14 Claims. (Cl. 318—19)

(Granted under the act of March 3, 1883, as amended April 30, 1928; 370 O. G. 757)

This invention relates to apparatus which continuously causes a pointing means to automatically follow a heavenly body from any given point on earth with data of hour angle, and declination.

This invention also relates to apparatus which will give continuous information on azimuth and elevation of a heavenly body from data of hour angle, and declination.

In the study of stars and planets it is sometimes necessary to continuously follow such stars and planets as they move relative to the earth. For many applications this must be done with great accuracy so that merely sighting by eye will not be satisfactory. It may often occur that due to climatic conditions the body cannot be seen but yet it may be desirable to follow the body with some sensing device such as a sharp beam radio antenna.

For other purposes, it may be desirable to have continuous information on the azimuth and elevation of a heavenly body relative to a given point on the earth from data of hour angle and declination of a given heavenly body. This information can be put in electrical form and used to operate motor mechanisms which will orientate telescopes, radar antennas, or other sensing devices so that they will point accurately at and will follow a given heavenly body.

One object of this invention is therefore to provide a relatively simple method and apparatus for accurately tracking or continuously following a heavenly body as it moves relative to the earth.

Another object of this invention is to provide a method and apparatus for giving continuous information of azimuth and elevation of a given heavenly body from data of declination and hour angle.

Still another object of this invention is to provide relatively simple apparatus which will accurately control other sensing devices remote from the said apparatus so that it will accurately follow a heavenly body whose hour angle, and declination is known.

In the drawings,

Figure 1 is a diagram showing the various vectors and angles involved in the determination of the location of a heavenly body relative to the center of the earth and to a known position on the surface of the earth.

Figure 2 is a diagrammatical view of various vectors and angles relative to a known position on the earth, and also indicates the position of various elements of the apparatus forming the invention relative to the vectors there shown.

Figure 3 is a perspective view of the apparatus used to obtain the azimuth and elevation information of the heavenly body as it moves relative to the earth.

Figure 4 shows a high radio frequency antenna unit which is to be controlled by the apparatus shown in Figure 3.

Figure 5 shows the various mechanisms used to impart motion to shaft 20 of Figure 3.

Figure 6 shows a modification of the embodiment of Figure 3.

The position of the various stars and planets relative to the earth is determined from published data of declination and hour angle. As given in the published tables, the hour angle is stated relative to the meridian passing through Greenwich, England. The declination is the same any where on the earth.

Referring to Figure 1, point $o$ represents the center of the earth, and arc $ayb$ is the earth's equator extending only ¼ around the earth. Arcs $adc$ and $bfc$ represent meridian lines extending from the equator to the north pole located at point $c$. Line $oc$ is the axis of the earth and lines $oa$ and $ob$ are lines in the equatorial plane at right angles to each other and to the earth's axis $oc$ extending from the center of the earth $o$ to points $a$ and $b$ respectively on the equator. The various arcs and lines heretofore mentioned thus form an equatorial plane 2 and two planes 3 and 5 which are at right angles to each other and to the equatorial planes. Vector $oi$ points toward the planet or star to be located and lies in a plane designated 4 bounded by the meridian line $ciy$ and axis line $oc$. Line $oy$ is the projection of vector $oi$ on the equatorial plane 2.

Point $d$ represents the point on the earth at which the apparatus constituting the invention is to be located. Its latitude angle is angle $aod$ and it is located on the meridian $adc$. Portion 6 represents a portion of the earth's surface and thus is a section of a spherical surface. Plane 1 on the other hand, is a plain surface which is parallel to the equatorial plane 2 and contains the point $d$. Line or (line $dd'$ in Figure 2) is a line from the center of the earth passing through point $d$ and is therefore the zenith line extending directly overhead. (A vertical line on the surface of the earth.) Line $dx$ (line $d'x'$ in Figure 2) is a line parallel to the earth's axis and so it lies in plane 3 and its projection on the earth's surface is along a true north south line which is along the meridian line $arc$. Line $du$ ($d'u'$ in Figure 2) is a vector which is to point in the direction of the heavenly body to be followed and since the distances from the earth to these bodies is so much greater than the diameter of the earth, this line is for all practical purposes parallel to the vector $oi$.

The hour angle for any given location on the earth's surface of a star or planet is defined as the angle between the projection of the meridian passing through a given location on the earth on the equatorial plane, line $oa$, and the projection of the vector line $oi$ on the equatorial plane, line $oy$, measured in a clockwise direction (for a point in the northern hemisphere). Angle $aoy$ is therefore 360 degrees minus the hour angle. The declination angle is defined as the angle between the vector $oi$ and equatorial plane, that is angle $ioy$. The declination angle is therefore the same value at any given time no matter what location one is on the earth. The hour angle at any given time varies with the position on the earth, but if the hour angle is known for any one position on the earth, say Greenwich, England, then the hour angle of a point in the United States can obviously be obtained from the latitude of that point.

In order to cause a device to follow a given star or planet from information of hour angle and declination it is necessary to first position a pointing means on the surface of the earth which will be parallel to the vector $oi$. If the star or planet can be seen this can be done by merely directing the pointing means toward visible star or planet. Next to enable the pointing means to follow a given heavenly body automatically it is necessary to relate the pointing means with various shafts and components which are so positioned and related that by causing the shafts and components to have motions which are proportional to the hour angle and declination variations the pointing means will automatically follow a given heavenly body. The method and apparatus by which the pointing means is caused to follow the heavenly body is disclosed more clearly in Figures 2-4, and by the paragraphs to follow.

In describing the apparatus and method for causing a pointing device to continuously follow a heavenly body it will be assumed that a given planet cannot be seen due to climatic conditions or other factors.

In reference to Figure 2, before the pointer indicated diagrammatically at 17 in Figure 2 can be pointed at a given heavenly body from a given reference point $d'$ on the earth, at least two reference lines must first be established relative to point $d'$. First a line $d'x'$ parallel to the earth's axis and passing through point $d'$ must be located. Secondly a line $d'k'$ passing through point $d'$ and parallel to line $oa$ is located. Line $d'k'$, of course, will be perpendicular to the line $d'x'$ since $oa$ is perpendicular to $oc$. Then, by measuring off an angle $k'd'g'$ equal to angle $aoy$ (360 degrees minus the hour angle) in an imaginary plane $I'$ which contains line $d'k'$ and which is perpendicular to line $d'x'$, a line $d'g'$ is located which is parallel to $oy$. Then by measuring off an angle $g'd'u'$ equal to the declination angle $ioy$ in a plane perpendicular to plane $I'$ and which contains line $d'x'$ (this plane is parallel to plane 4) a line $d'u'$ is located which is parallel to vector $oi$. Thus pointer 17 when placed along lines $d'u'$ will be accurately pointing toward the given heavenly body.

To locate a line $d'x'$ passing through point $d'$ and parallel to the earth's axis two things are necessary. The direction of true north, and the latitude of point $d'$. Since, as can be seen from Figure 1, the earth's axis $oc$ lies in plane 3, in which point $d$ lies (and $d'$ too for all practical purposes), line $d'x'$ must also lie in the same plane 3 and so the projection of line $d'x'$ ($dm'$) onto the earth's surface 6 must be along meridian line $adc$ which at point $d$ includes true north-south line $nm'$ in Figure 2. It can be shown that the angle (elevation angle) which a line $d'x'$ parallel to the earth's axis makes with a horizontal line at point $d'$ (this horizontal line is not shown in Figure 2 to lessen confusion of lines) is equal to the latitude angle $aod$. Thus a line $d'x'$ parallel to the earth's axis $oc$ can be located by locating line $d'x'$ having a projection on the earth along a north-south line $dm'$ and having an elevation angle equal to the latitude angle.

Now with line $d'x'$ located, it is an easy matter to locate a line $d'k'$ which is parallel to line $oa$. Line $d'k'$ is both perpendicular to line $d'x'$ and lies in plane 3. Therefore its projection on the earth's surface must fall along the meridian or true north-south line $nm'$. Thus line $d'k'$, is a line whose projection on the earth is along a true north-south line $nm'$ and is perpendicular to the already located line $d'x'$.

As the earth rotates from west to east the heavenly bodies will appear to move from east to west with respect to the earth. That is, vector $oi$ and its projection on the equatorial plane 2 $oy$ will move clockwise with respect to a point $d'$. Since stars are fixed relative to the solar system, their change in hour angle will be at a constant rate. Planets and the sun, on the other hand, will have hour angles which will vary in rate. It can be seen, however, that if pointing means 17 is rotated about axis line $d'x'$ in a clockwise direction at a rate proportional to the hour angle change of a given heavenly body, and its angle with plane $I'$ is made to vary with the angle of declination, that the pointing means 17 will always point toward the given heavenly body since it is thereby kept parallel with vector $oi$.

The projecting vector $d'u'$ ($du$ in Figure 1) onto the surface of the earth gives line $dj'$ ($dj$ in Figure 1). Angle $m'dj'$ ($mdj$ in Figure 1) is the azimuth angle and $u'd'v'$ ($udv$ in Figure 1) is the elevation angle of the vector $d'u'$ ($du$ in Figure 1).

Referring to Figures 2-4 in particular, the basic components of the apparatus there shown comprise a first rotatable shaft 20 which is initially positioned along a line $d'x'$ parallel to the axis of the earth; a pointing means 17 which is to point towards and follow a given heavenly body; levers 18—19 coupled between shaft 20 and pointing means 17 control the position of pointing means 17; and a swivel bearing 8 which is rigidly connected to a rotatable vertical shaft 9 and which carries a rotatable horizontal shaft 7. Since the pointing means is rigidly connected to shaft 7, the angular position of shaft 7 gives indication of elevation, and the angular position of shaft 9 gives an indication of azimuth since any movement of pointing means 17 in a plane other than a vertical plane will move shaft 9. Numerals 10 and 13 refer to indicating or control devices connected to shafts 7 and 9 respectively for converting the angular positions of shafts 7 and 9 into visual indications of elevation and azimuth respectively or into voltages which are either proportional to azimuth and elevation used to execute vertical and horizontal shaft control motors 23 and 25 of the antenna 28 shown in Figure 4. To obtain voltages proportional to elevation and azimuth, devices 10 and 13 may take the form of selsyn generators, variacs or the like. If a device is to be controlled to follow pointing means 17 such as the high frequency antenna 29 and reflector 28 in Figure 4, then the shafts 7 and 9 would be connected to selsyn transmitter devices. Numerals 23 and 25 (seen Figure 4) refer to selsyn receiver devices which control shafts 30 and 26 which are connected by a swivel bearing 24, which is equivalent to that of bearing 8 in Figure 3. The antenna device 27 is rigidly connected to shaft 30, or to shafts coupled through gears with shaft 30. Conductors 11—12 and 14—15 carry the control voltages between the selsyn transmitter devices represented by numerals 10 and 13 in Figures 2-3, and the above mentioned selsyn receiver devices 23 and 25. Of course, other types of follow up devices can be used to move shafts 30 and 7, 9 and 26 without deviating from the scope of the present invention.

Referring now to the preferred method and means of causing pointing means 17 to automatically follow a given star or planet, (see Figures 3 and 5) lever arm 19 lies normal to shaft 20 and is rigidly attached thereto. Rotatable shaft 20 is journaled in a pair of pillar bearings 22 so tilted that the axis of shaft 20 lies parallel of the earth's axis, if pointed in a northerly direction, and passes through point $d'$ from which pointing means 17 swivels. In Figure 3, lever arm 18 which links the arm 19 to pointer 17 is rigidly supported in an opening 36 in the end of arm 19. Arm 18 supports a ring 36a which is pivotally supported by yoke 38 in the end of arm 18, and said ring has an opening 37 through which pointing means 17 is slidably and pivotally supported. Ring 36a is pivotally supported in the yoke 38 by means of two arms. These two arms are in a plane which is perpendicular to a plane containing shaft 20 and lever arm 19. Accordingly, pointing means 17 can slide in ring 36a and at the same time this ring 36a can be pivoting about pointing means 17 and yoke 38. Thus assuming the declination of a heavenly body was constant, revolving shaft 20 at a rate equal to the rate of change of hour angle will automatically direct pointing means 17 toward the heavenly body. If the declination also varies, then the portion of ring 36a adjacent the opening 37 must be moved so that the ratio of length $zz'$ to length $d'z$ is equal to the tangent of the declination angle. This can be accomplished in various ways. By translating shaft 20 in Figure 3 along its axis $d'x'$, the declination angle of pointing means 17 may be changed. For example, if shaft 20 is moved toward point $d'$, ring 36a will slide down pointing means 17, shaft 9 will rotate counterclockwise, shaft 7 will rotate and ring 36a will pivot about pointing means 17 and yoke 38 as required to permit the new declination angle to be established. In Figure 5, means are shown for translating and rotating shaft 20. Here the shaft 20 in addition to being rotated is translated along its axis line $d'x'$ so that $zz'/d'z$ is equal to the tangent of the declination angle of the heavenly body. A synchronous motor 30 through gears 40 and 39 impart rotary motion to shaft 20. The synchronous motor is controlled by an oscillator device 31 which feeds a voltage varying in frequency with the change in rate of hour angle. This oscillator frequency could be varied by imparting motion to a shaft of a variable condenser which it is part of the frequency determining circuit of the oscillator. Shaft 20 is translated by means of a synchronous motor 46 which rotates a cam 45 on which lever arm 44 rides. The cam 45 is so cut that it translates shaft 20 so that the relationship $zz'/d'z$ equals the tangent of the declination angle. The movement of arm 44 rotates shaft 43 which translates rack 41 through spur gear 42. Instead of translating shaft 20, to impart correction for angle of declination shaft 18 may be translated along a line parallel to line $d'x'$. This has the disadvantage, however, of mounting the translatory apparatus in such a manner that it must rotate with arm 19.

One possible variation of the apparatus shown in Figure 3 is shown in Figure 6. There, the declination information instead of being fed to the apparatus in the form of translating motion of shaft 20, is fed in the form of rotary motion through shaft 49. Shaft 49 is driven by a synchronous motor at a rate equal to the rate of change of declination. Shaft 20 as before rotates at a rate equal to the rate of change of hour angle. A semi-circular member 47 is an extension of shaft 20 and supports shaft 49. The rotary motion of shaft 49 is transmitted through semicircular member 48 which positions pointer 17 so that it has the proper declination angle.

Although the invention thus far has been disclosed wherein shaft 20 was kept parallel to the earth's axis, it should be apparent that once the device is built with the proper relationship between shaft 20 and the so called vertical axis of relation of the pointer 17 (axis of shaft 9), the device shown in Figure 3 or 6 can be placed in any position and still be operative where only azimuth and elevation information is desired or when the device there shown is utilized to cause a remotely located object such as antenna 28 to follow a given heavenly body.

For example, assume that a directional radar antenna 28 (see Figure 4) is to be pointed continuously at the moon. Shafts 7 and 9 are connected to selsyn transmitters 10 and 13 respectively which are coupled to selsyn receivers 23 and 25 in Figure 4. The apparatus as shown in Figure 3 can be placed on its side if desired. The shafts 26 and 30, however, of the radar antenna 28 must be respectively in a vertical and horizontal position. Shafts 7 and 9 are then initially set so that antenna 29 has the actual azimuth and elevation of the moon at that particular time. Then if shaft 20 is rotated at a rate equal to the rate of change of the moon's hour angle, and the ratio of $zz'/d'z$ is kept equal to the tangent of the moon's declination angle, then antenna 28 will accurately follow the moon.

If pointer 17 is itself to follow the moon, then of course, shaft 20 must be positioned so that it is actually parallel to the earth's axis.

The embodiments disclosed in the drawings and specification are exemplary only and many modifications and variations may be made without deviating from the invention as is described in the claims.

The invention described herein may be manufactured and used by or for the Government of the United States of America for governmental purposes without the payment of any royalties thereon or therefor.

What is claimed is:

1. Apparatus for causing a pointing means to follow a heavenly body whose motion relative to the earth is known by data of hour angle and declination comprising a first rotatable shaft whose axis is positioned parallel to the axis of the earth and which passes through a given point, a second rotatable shaft whose axis is along a vertical line, a third rotatable shaft whose axis is along a horizontal line, a first means for interconnecting said second and third shafts so that their axis pass through said given point and so that the said horizontal shaft will pivot in a horizontal plane about the axis of the said vertival shaft as said vertical shaft is rotated, a second means connected to said first rotatable shaft for rotation therewith, a portion of said second means being moveable relative to said given point so that a point located on said portion will be moveable in a plane in which the axis of the said first rotatable shaft lies, said pointing means being rigidly connected to the horizontal shaft and extending along a line containing the last named point and the said given point, means connecting said pointing means and said portion so that said pointing means is always in contact with said last named point.

2. Apparatus for causing a pointing means to follow a heavenly body whose motion relative to the earth is known by data of hour angle and declination comprising a first rotatable shaft whose axis is positioned parallel to the axis of the earth and which passes through a given point, a second rotatable shaft whose axis is along a vertical line, a third rotatable shaft whose axis is along a horizontal line, a first means for interconnecting said second and third shafts so that their axis pass through said given point and so that the said horizontal shaft will pivot in a horizontal plane about the axis of the said vertical shaft as said vertical shaft is rotated, a second means connected to said first rotatable shaft for rotation therewith, a portion of said second means being moveable relative to said given point so that a point located on said portion will be moveable in a plane in which the axis of the said first rotatable shaft lies, said pointing means being rigidly connected to the horizontal shaft and extending along a line containing the last named point and the said given point, a third means connecting said pointing means and said portion so that said pointing means is always in contact with said last named point, a fourth means connected to said first shaft for rotating same in a direction opposite to that of earth's rotation about its axis, and at an angular rate proportional to the change of hour angle of said heavenly body, and a fifth means coupled to said second means for causing the angle between said last mentioned line and a plane perpendicular to said first rotatable shaft to be equal to and vary with the declination of said heavenly body.

3. Apparatus for obtaining a continuous indication of azimuth and elevation angles relative to a given position on the earth of a heavenly body whose hour angle and declination angles are known comprising a first rotatable shaft whose axis passes through a given point, a second rotatable shaft whose axis passes through said given point and which makes an angle with the axis of said first rotatable shaft equal to the latitude angle of said position on the earth, a third rotatable shaft whose axis is at right angles to the axis of said second shaft and also passes through said given point, means for interconnecting said second and third shafts so that the said third shaft will pivot about the axis of said second shaft as said second shaft is rotated, a second means connected to said first rotatable shaft for rotation therewith, a portion of said second means being moveable relative to said given point so that a point located on said portion will be moveable in a plane in which the axis of the said first rotatable shaft lies, a coupling means rigidly coupled to the said third shaft and extending along a line containing the last named point and the said given point, a third means for connecting said coupling means and said portion so that said coupling means is always in contact with said last named point, a fourth means connected to said first shaft for rotating same in a sense opposite to that of earth's rotation about its axis, and at an angular rate proportional to the change of hour angle of said heavenly body and a fifth means coupled to said second means for causing the angle between said last mentioned line and a plane perpendicular to said first rotatable shaft to be equal to and vary with the declination of said heavenly body, indicating means connected to said second and third rotatable shaft for continuously giving an indication of the azimuth and elevation respectively of said heavenly body.

4. Apparatus for obtaining a continuous indication of azimuth and eleation angles at a given position on the earth of a heavenly body whose hour angle and declination angles are known comprising a first rotatable shaft whose axis passes through a given point, a second rotatable shaft whose axis passes through said given point and which makes an angle with the axis of said first rotatable shaft equal to the latitude angle of said position on the earth, a third rotatable shaft whose axis is at right angles to the axis of said second shaft and also passes through said given point, means for interconnecting said second and third shafts so that the said third shaft will pivot about the axis of said second shaft as said second shaft is rotated, a second means connected to said first rotatable shaft for rotation therewith, a portion of said second means being moveable relative to said given point so that a point located on said portion will be moveable in a plane in which the axis of the said first rotatable shaft lies, coupling means rigidly coupled to the said third rotatable shaft and extending along a line containing the last named point and the said given point, a third means for connecting said coupling means and said portion so that said coupling means is always in contact with said last named point, a fourth means connected to said first shaft for rotating same in a sense opposite to that of earth's rotation about its axis, and at an angular rate proportional to the change of hour angle of said heavenly body, and a fifth means coupled to said second means for causing the angle between said last mentioned line and a plane perpendicular to said first rotatable shaft to be equal to and vary with the declination of said heavenly body, means coupled to said second and third rotatable shafts for developing voltages proportional to the angles of rotation of the respective shaft whereby the value of said voltages respectively are a measure of the azimuth and elevation of said heavenly body.

5. Apparatus for causing a device located at a given position on earth to follow a heavenly body whose motion relative to the earth is known by data of hour angle and declination comprising a first rotatable shaft whose axis passes through a given point, a second rotatable shaft whose axis passes through said given point and which makes an angle with the axis of said first rotatable shaft equal to the latitude angle of said position on the earth, a third rotatable shaft whose axis is at right angles to the axis of said second shaft and also passes through said given point, means for interconnecting said second and third shafts so that the said third shaft will pivot about the axis of said second shaft as said second shaft is rotated, a second means connected to said first rotatable shaft for rotation therewith, a portion of said second means being moveable relative to said given point so that a point located on said portion will be movebale in a plane in which the axis of the said first rotatable shaft lies, a pointing means rigidly coupled to the said third rotatable shaft and extending along a line containing the last named point and the said given point, a third means for connecting said pointing means and said portion so that said pointing means is always in contact with said last named point, a fourth means connected to said first shaft for rotating same in a sense opposite to that of earth's rotation about its axis, and at an angular rate proportional to the change of hour angle of said heavenly body, and a fifth means coupled to said second means for causing the angle between said last mentioned line and a plane perpendicular to said first rotatable shaft to be equal to and vary with the declination of said heavenly body, a first and second selsyn transmitter means coupled respectively to said second and third rotatable shafts, a first and second selsyn receiver means electrically coupled respectively to said first and second selsyn transmitter means and having rotatable shafts respectively extending along a vertical and a horizontal line, said device which is to continuously follow said heavenly body being rotatable with and about said respective shafts of the said first, and second receiver selsyns so that said device will follow and be parallel to said pointing means.

6. Apparatus for causing a device located at a given position on the earth to follow a heavenly body whose motion relative to the earth is known by data of hour angle and declination comprising a first rotatable shaft whose axis passes through a given point, a second rotatable shaft whose axis passes through said given point and which makes an angle with the axis of said first rotatable shaft equal to the latitude angle of said position on the earth, a third rotatable shaft whose axis is at right angles to the axis of said second shaft and also passes through said given point, means for interconnecting said second and third shafts so that the said third shaft will pivot about the axis of said second shaft as said second shaft is rotated, a second means connected to said first rotatable shaft for rotation therewith, a portion of said second means being moveable relative to said given point so that a point located on said portion will be moveable in a plane in which the axis of the said first rotatable shaft lies, pointing means rigidly coupled to the said third rotatable shaft and extending along a line containing the last named point and the said given point, a third means for connecting said pointing means and said portion so that said pointing means is always in contact with said last named point, a fourth means connected to said first shaft for rotating same in a sense opposite to that of earth's rotation about its axis, and at an angular rate proportional to the change of hour angle of said heavenly body, and a fifth means coupled to said second means for causing the angle between said last mentioned line and a plane perpendicular to said first rotatabe shaft to be equal to and vary with the declination of said heavenly body, follow-up means connected respectively between said second and third rotatable shafts and said device which is to continuously follow said heavenly body so that said device will always be parallel to said pointing means.

7. Apparatus for causing a device located at a given position on the earth to follow a heavenly body whose motion relative to the earth is known by data of hour angle and declination comprising a first rotatable shaft whose axis passes through a given point, a second rotatable shaft whose axis passes through said given point and which makes an angle with the axis of said first rotatable shaft equal to the latitude angle of said position on the earth, a third rotatable shaft whose axis is at right angles to the axis of said second shaft and also passes through said given point, means for interconnecting said second and third shafts so that the said third shaft will pivot about the axis of said second shaft as said second shaft is rotated, a second means connected to said first rotatable shaft for rotation therewith, a portion of said second means being moveable relative to said given point so that a point located on said portion will be moveable in a plane in which the axis of the said first rotatable shaft lies, pointing means rigidly coupled to the said third rotatable shaft and extending along a line containing the last named point and the said given point, a third means for connecting said pointing means and said portion so that said pointing means is always in contact with said last named point, a fourth means connected to said first shaft for rotating same in a sense opposite to that of earth's rotation about the axis and at an angular rate proportional to the change of hour angle of said heavenly body, and a fifth means coupled to said second means for causing the angle between said last mentioned line and a plane perpendicular to said first rotatable shaft to be equal to and vary with the declination of said heavenly body, a fourth rotatable shaft whose axis is along a vertical line, a fifth rotatable shaft whose axis is along a horizontal line, a sixth means for interconnecting said fourth and fifth shaft so that they pass through the same point and so that the fifth rotatable shaft can pivot in a horizontal plane about the axis of the fourth rotatable shaft and rotate therewith, said device for following said heavenly body being rigidly connected to said fifth rotatable shaft, follow up means connected respectively between said third and fifth, and said second and fourth rotatable shafts whereby the said device in causes to follow said pointing means and thus follow the said heavenly body.

8. Apparatus for causing a pointing means to follow a heavenly body whose motion relative to the earth is known by data of hour angle and declination comprising a first rotatable shaft whose axis is positioned parallel to the axis of the earth and which passes through a given point, a second rotatable shaft whose axis is along a vertical line, a third rotatable shaft whose axis is along a horizontal line, a first means for interconnecting said second and third shafts so that they pass through said given point and so that the said horizontal shaft will pivot in a horizontal plane about the axis of the said vertical shaft is rotated, a second means connected to said first rotatable shaft for rotation therewith, a portion of said second means being moveable relative to said given point and having an opening therein, said pointing means being rigidly connected to said horizontal shaft and extending along a first line passing through the said given point and the center of said opening, the part of said pointing means which is to pass through said opening having such a cross-sectional dimension that it has a sliding fit with the sides of said opening, a third means coupled to said second means for translating said portion along a line parallel to the axis of said first rotatable shaft so that the angle between said first line and a plane perpendicular to said first rotatable shaft is equal to and varies with the declination of said heavenly body, a fourth means connected to said first shaft for rotating same and an angular rate proportional to the change of hour angle of said heavenly body.

9. Apparatus for causing a pointing means to follow a heavenly body whose motion relative to the earth is known by data of hour angle and declination comprising a first rotatable shaft whose axis is positioned parallel to the axis of the earth and which passes through a given point, a second rotatable shaft whose axis is along a vertical line, a third rotatable shaft whose axis is along a horizontal line, a first means for interconnecting said second and third shafts so that they pass through said given point and so that the said horizontal shaft will pivot in a horizontal plane about the axis of the said vertical shaft as said vertical shaft is rotated, a second means connected to said first rotatable shaft for rotation therewith, a portion of said second means being moveable along a line which is parallel to the axis of said first rotatable shaft and having an opening therein, said pointing means being rigidly connected to said horizontal shaft and extending along a first line passing through the said given point and the center of said opening, the point portion of said pointing means which is to pass through said opening having such a cross sectiontal dimension that it has a sliding fit with the sides of said opening.

10. A method of causing a pointing means to automatically follow a given heavenly body whose hour angle and declination is known which comprises the steps of orientating a first rotatable shaft so that it is parallel to the axis of the earth, mounting the pointing means on a swivel joint so that the end attached to the joint swivels about a point which is located on the axis of the first rotatable shaft, moving said pointing means into such a position that its projection upon a first plane, which is perpendicular to the said first rotatable shaft, makes an angle with a first line passing through said point and which is in the said first plane, said first line when vertically projected on the horizontal plane falls along a line which runs true north and south, measured in a direction opposite to the direction in which the earth rotates, and equal to the hour angle of the said heavenly body for that time, and so that the angle between said first plane and said pointing means is equal to the declination of said heavenly body at the said time, connecting a first means to said first rotatable shaft so that it will rotate with same and which has a portion which is moveable relative to said point in a plane in which the axis of the first rotatable shaft is located, connecting said portion to said pointing means so that the said portion will always be in contact with said pointing means, causing said first rotatable shaft to rotate in a direction opposite to that of the earth's rotation about its axis, and at a rate of change of hour angle of the said heavenly body, causing the angle between the said pointing means and said first plane to vary with the declination of said heavenly body.

11. A method of causing a pointing means to automatically follow a given heavenly body whose hour angle and declination is known which comprises the steps of orientating a first rotatable shaft so that it is parallel to the axis of the earth, mounting the pointing means on a swivel joint so that the end attached to the joint swivels about a point which is located on the axis of the first rotatable shaft, pointing said means at said heavenly body, connecting a first means to said first rotatable shaft so that it will rotate with same and which has a portion which is moveable relative to said point in a plane in which the axis of the first rotatable shaft is located, connecting said portion to said pointing means so that the said portion will always be in contact with said pointing means, causing said first rotatable shaft to rotate in a direction opposite to that of the earth's rotation about its axis, and at a rate equal to the rate of change of hour angle of the said heavenly body, causing the angle between the said pointing means and a plane perpendicular to the axis of the said first rotatable shaft to vary with the declination of said heavenly body.

12. Apparatus for causing a pointing means to follow a heavenly body whose motion relative to the earth is known by data of hour angle and declination comprising a first rotatable shaft whose axis is positioned parallel to the axis of the earth and which passes through a given point, a first means connected to said first rotatable shaft for rotation therewith, a portion of said first means being moveable relative to said given point so that a second point located on said portion will be moveable in a plane in which the axis of the said first rotatable shaft lies, a second means for positioning said pointing means so that it swivels about said given point, a third means for connecting said pointing means and said portion so that said pointing means is always in contact with said second point, a fourth means connected to said first shaft for rotating same in a direction opposite to that of the earth's axis, and at an angular rate proportional to the change of hour angle of said heavenly body, and a fifth means coupled to said first means for causing a line between said given point and said second point to make an angle with a plane perpendicular to the axis of said first rotatable shaft to be equal to and vary with the declination of said heavenly body.

13. Apparatus for obtaining a continuous indication of azimuth and elevation angles relative to a given position on the earth of a heavenly body whose hour angle and declination angles are known comprising a first rotatable shaft whose axis passes through a given point, a second rotatable shaft whose axis passes through said given point and which makes an angle with the axis of said first rotatable shaft equal to the latitude angle of said position on the earth, a third rotatable shaft whose axis is at right angles to the axis of said second shaft and also passes through said given point, means for interconnecting said second and third shafts so that the said third shaft will pivot about the axis of said second shaft as said second shaft is rotated, a second means connected to said first rotatable shaft for rotation therewith, a portion of said second means being movable relative to said given point so that a point located on said portion will be moveable in a plane in which the axis of the said first rotatable shaft lies, a coupling means rigidly coupled to the said third shaft and extending along a line containing the last named point and the said given point, a third means for connecting said coupling means and said portion so that said coupling means is always in contact with said last named point, a fourth means connected to said first shaft for rotating same in a sense opposite to that of earth's rotation about its axis, and at an angular rate proportional to the change of hour angle of said heavenly body, and a fifth means coupled to said second means for causing the angle between said last mentioned line and a plane perpendicular to said first rotatable shaft to be equal to and vary with the declination of said heavenly body.

14. Apparatus for obtaining a continuous indication of azimuth and elevation angles at a given position on the earth of a heavenly body whose hour angle and declination angles are known comprising a first rotatable shaft whose axis passes through a given point, a second rotatable shaft whose axis passes through said given point and which makes an angle with the axis of said first rotatable shaft equal to the latitude angle of said position on the earth, a third rotatable shaft whose axis is at right angles to the axis of said second shaft and also passes through said given point, means for interconnecting said second and third shafts so that the said third shaft will pivot about the axis of said second shaft as said second shaft is rotated, at least one arm member rigidly extending from said first rotatable shaft, a fourth shaft rotatably supported by said arm member, the axis of said second shaft passing through said given point, a second arm member connected to said fourth shaft for rotation therewith and having a point thereon which lies in a plane which is perpendicular to said fourth rotatable shaft and which contains the axis of said first rotatable shaft, a connecting means rigidly coupled between said third rotatable shaft and the said point on said second arm member, a second means connected to said first rotatable shaft for rotating same in a sense opposite to that of the earth's rotation about its axis, and at an angular rate proportional to the change of hour angle of said heavenly body, a third means coupled to said fourth rotatable shaft for rotating same to a degree proportional to the change of declination angle of said heavenly body.

J. EDWIN SEES.

REFERENCES CITED

The following references are of record in the file of this patent:

UNITED STATES PATENTS

| Number | Name | Date |
| --- | --- | --- |
| 55,523 | Morawetz et al. | June 12, 1866 |
| 125,030 | Dille et al. | Mar. 26, 1872 |
| 260,657 | Calver | July 4, 1882 |
| 460,417 | Wilson | Sept. 29, 1891 |
| 507,999 | Davis | Nov. 7, 1893 |
| 913,051 | Pope | Feb. 23, 1903 |
| 1,182,405 | Ohlson | May 9, 1916 |
| 1,195,876 | Tsukalas | Aug. 22, 1916 |
| 1,346,412 | Meitner | July 13, 1920 |
| 1,733,531 | Dugan | Oct. 29, 1929 |
| 1,829,181 | Bates | Oct. 27, 1931 |
| 2,069,417 | Murtagh et al. | Feb. 2, 1937 |